United States Patent
Trantham et al.

(10) Patent No.: US 10,802,853 B2
(45) Date of Patent: Oct. 13, 2020

(54) ACTIVE DRIVE

(71) Applicant: SEAGATE TECHNOLOGY LLC, Cupertino, CA (US)

(72) Inventors: Jon D. Trantham, Shakopee, MN (US); Robert John Warmka, Shakopee, MN (US); Chiaming Yang, Fremont, CA (US); David B. Anderson, Shakopee, MN (US); Bryan David Wyatt, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 15/378,983

(22) Filed: Dec. 14, 2016

(65) Prior Publication Data

US 2018/0107499 A1    Apr. 19, 2018

Related U.S. Application Data

(60) Provisional application No. 62/408,446, filed on Oct. 14, 2016.

(51) Int. Cl.
```
G06F 9/455      (2018.01)
G06F 8/40       (2018.01)
G06F 8/61       (2018.01)
G06F 9/445      (2018.01)
```
(52) U.S. Cl.
CPC ............ G06F 9/45508 (2013.01); G06F 8/40 (2013.01); G06F 8/61 (2013.01); G06F 9/445 (2013.01)

(58) Field of Classification Search
CPC ........ G06F 9/45508; G06F 8/40; G06F 9/445; G06F 8/61

USPC ......................................................... 717/139
See application file for complete search history.

(56) References Cited

U.S. PATENT DOCUMENTS

| | | | |
|---|---|---|---|
| 5,548,751 A | 8/1996 | Ryu et al. |
| 5,771,379 A | 6/1998 | Gore, Jr. et al. |
| 6,128,012 A | 10/2000 | Seidensticker, Jr. |
| 6,226,665 B1 | 5/2001 | Deo |
| 6,253,370 B1 | 6/2001 | Abadi et al. |
| 6,282,697 B1 | 8/2001 | Fables et al. |
| 6,298,401 B1 | 10/2001 | Anderson |
| 6,317,143 B1 | 11/2001 | Wugofski |
| 6,321,358 B1 | 11/2001 | Anderson |
| 6,466,978 B1 | 10/2002 | Mukherjee |
| 6,601,101 B1 | 7/2003 | Lee et al. |

(Continued)

OTHER PUBLICATIONS

Cornwell, "Anatomy of a Solid-State Drive", [Online], 2012, pp. 59-63, [Retrieved from internet on Aug. 18, 2020], <https://dl.acm.org/doi/pdf/10.1145/2380656.2380672> (Year: 2012).*

(Continued)

*Primary Examiner* — Geoffrey R St Leger
*Assistant Examiner* — Zengpu Wei
(74) *Attorney, Agent, or Firm* — Westman, Champlin & Koehler, P.A.

(57) ABSTRACT

A data storage drive that includes a data storage medium and drive control circuit communicatively coupled to the data storage medium. The data storage drive also includes embedded applet management circuitry that executes an application, installed in the data storage drive as one or more key-value objects, within a controlled environment of the data storage drive.

20 Claims, 11 Drawing Sheets

(56) References Cited

U.S. PATENT DOCUMENTS

| | | | |
|---|---|---|---|
| 6,826,613 | B1 | 11/2004 | Wang et al. |
| 6,993,524 | B1 | 1/2006 | Watanabe et al. |
| 7,231,401 | B1 | 6/2007 | Inohara et al. |
| 7,328,303 | B1 | 2/2008 | Waterhouse |
| 7,469,837 | B2* | 12/2008 | Mizushima ........... G06F 21/606 235/451 |
| 7,634,477 | B2 | 12/2009 | Hinshaw |
| 7,725,614 | B2 | 5/2010 | Jogand-Coulomb |
| 7,826,161 | B2 | 11/2010 | Riedel |
| 7,840,937 | B1 | 11/2010 | Chiluvuri |
| 8,078,448 | B1 | 12/2011 | Wholberg et al. |
| 8,661,425 | B1 | 2/2014 | Polyudov |
| 8,793,531 | B2 | 7/2014 | George et al. |
| 8,880,551 | B2 | 11/2014 | Hinshaw et al. |
| 9,015,333 | B2 | 4/2015 | Rao et al. |
| 9,172,698 | B1 | 10/2015 | Evans et al. |
| 9,298,521 | B1 | 3/2016 | Feldman |
| 9,641,385 | B1 | 5/2017 | Daniel et al. |
| 9,798,673 | B2* | 10/2017 | Peterson ............. G06F 12/0638 |
| 9,830,203 | B2* | 11/2017 | Schnellinger ............ G06F 9/54 |
| 9,874,915 | B2 | 1/2018 | Frick |
| 9,990,305 | B2* | 6/2018 | Baruch ............... G06F 12/1036 |
| 2001/0052038 | A1* | 12/2001 | Fallon ....................... G06F 1/24 710/68 |
| 2002/0095525 | A1 | 7/2002 | Fables et al. |
| 2004/0003043 | A1 | 1/2004 | Rajamony et al. |
| 2005/0081187 | A1* | 4/2005 | Odinak ................ G06Q 20/341 717/101 |
| 2006/0070043 | A1* | 3/2006 | Viega .................. G06F 9/44589 717/136 |
| 2006/0288156 | A1 | 12/2006 | Fish et al. |
| 2006/0289659 | A1* | 12/2006 | Mizushima ........... H04L 9/0897 235/492 |
| 2007/0203950 | A1 | 8/2007 | Inohara et al. |
| 2008/0229401 | A1 | 9/2008 | Magne |
| 2008/0307201 | A1 | 12/2008 | Flachs |
| 2010/0082929 | A1* | 4/2010 | Kobayashi .......... G06F 12/1441 711/163 |
| 2011/0019007 | A1 | 1/2011 | Elazar et al. |
| 2011/0025858 | A1 | 2/2011 | Elazar et al. |
| 2011/0307736 | A1 | 12/2011 | George et al. |
| 2012/0149302 | A1 | 6/2012 | Sekiya |
| 2012/0158998 | A1 | 6/2012 | O'Shea |
| 2012/0284473 | A1* | 11/2012 | Hsu ....................... G06F 21/554 711/164 |
| 2013/0262396 | A1* | 10/2013 | Kripalani ............ G06F 11/1469 707/674 |
| 2014/0281333 | A1* | 9/2014 | Peterson ............. G06F 12/0638 711/170 |
| 2014/0351830 | A1* | 11/2014 | Schnellinger ............ G06F 9/54 719/320 |
| 2015/0106784 | A1 | 4/2015 | Tzubary et al. |
| 2016/0085480 | A1* | 3/2016 | Chiu ..................... G06F 3/0647 711/117 |
| 2016/0085687 | A1* | 3/2016 | Baruch ............... G06F 12/1009 711/147 |
| 2017/0060442 | A1* | 3/2017 | Dunn .................... G06F 3/0608 |
| 2017/0149931 | A1 | 5/2017 | Lochhead et al. |
| 2017/0262267 | A1 | 9/2017 | Hans |
| 2018/0018326 | A1* | 1/2018 | Miyagaki ............ H04L 67/1097 |
| 2018/0107499 | A1 | 4/2018 | Trantham et al. |

OTHER PUBLICATIONS

Jin et al, "HiSMRfs: a High Performance File System for Shingled Storage Array", 2014, pp. 1-6, [Retrieved from internet on Aug. 18, 2020], <https://ieeexplore.ieee.org/stamp/stamp.jsp?tp=&arnumber=6855539> (Year: 2014).*

Li et al, "Reconfigurable Active Drive: An FPGA Accelerated Storage Architecture for Data-Intensive Applications", [Online], 2009, pp. 1-3, [Retrieved from internet on Aug. 18, 2020], <http://saahpc.ncsa.illinois.edu/09/papers/Teng_Li_paper.pdf> (Year: 2009).*

"Java API and Simulator for the Kinetic Open Storage Platform" from https://github.com/Kinetic/kinetic-java downloaded on Dec. 14, 2016.

"Kinetic Protocol Data Unit Structure" from https://github.com/Kinetic/kinetic-protocol downloaded on Dec. 14, 2016.

"Active Disks for Large-Scale Data Processing" IEEE Computer, Jun. 2001.

"Active Disk Architecture for Databases" Technical Report CMU-CS-00-145, May 2000.

"Data Mining on an OLTP System (Nearly) for Free" Proceedings of the 2000 ACM SIGMOD International Conference on Management of Data, Dallas, TX, May 2000.

"Active Disks—Remote Execution for Network-Attached Storage" Technical Report CMU-CS-99-177, Doctoral Dissertation. Pittsburgh, PA, Nov. 1999.

"Active Storage for Large-Scale Data Mining and Multimedia" Proceedings of the 24th International Conference on Very Large Databases (VLDB '98), New York, NY, Aug. 1998.

"Active Disks: Remote Execution for Network-Attached Storage" CMU-CS-97-198, Dec. 1997.

"Active Disks for Databases," NSIC/NASD Workshop on Network Storage for Databases: Asset, Apathy, or Albatross?, Millbrae, CA, Aug. 17, 1999.

"Active Disks—Remote Execution for Network-Attached Storage," Systems Seminar, University of California—Berkeley, Berkeley, CA, Oct. 8, 1998.

"Active Storage for Large-Scale Data Mining and Multimedia," 24th International Conference on Very Large Databases (VLDB '98), Vision Paper, New York, NY, Aug. 24, 1998.

"Active Disks for Large-Scale Data Mining and Multimedia," NSIC/NASD Workshop: What is to be done with lots more computing inside storage?, Oakland, CA, Jun. 8, 1998.

"Active Disks for Large-Scale Data Mining and Multimedia," SIGMOD '98—Data Mining and Knowledge Discovery Workshop, Seattle, WA, Jun. 5, 1998.

"Active Storage for Large-Scale Data Mining and Multimedia," Center for Automated Learning and Discovery (CALD) Seminar, Carnegie Mellon University, Apr. 3, 1998.

"Active Disks—A Case for Remote Execution in Network-Attached Storage," Parallel Data Systems Retreat, Nemacolin, PA, Oct. 29, 1997.

"Active Disks: Programming Model, Algorithms and Evaluation" (1998) by Anurag Acharya, Mustafa Uysal and Joel Saltz.

Office Action for U.S. Appl. No. 15/378,995, dated Mar. 8, 2018, 18 pages.

Final Office Action for U.S. Appl. No. 15/378,995, dated Sep. 19, 2018, 21 pages.

Non-Final Rejection for U.S. Appl. No. 15/378,995, dated Mar. 12, 2019, 15 pages.

Runde et al, "An Active Storage Framework for Object Storage Devices", published by IEEE, 2012, pp. 1-12 (Year: 2012).

John et al., "Active Storage using Object-Based Devices", published by IEEE, 2008, pp. 472-478 (Year: 2008).

Riedel et al., "Active disks for Large-Scale Data Processing", published by IEEE, 2001, pp. 68-74 (Year: 2001).

Lim et al., "Active Disk File Management System: A Distributed, Salable File System", published by IEEE Computer Society, 2003, pp. 101-116 (Year: 2003).

Advisory Action for U.S. Appl. No. 15/378,995, dated Dec. 11, 2018, 3 pages.

Office Action for Korean Patent Application No. 10-2017-0133554, dated Aug. 8, 2019, 17 pages.

Mok et al., "Efficient Run-Time Monitoring of Timing Constraints", published in Proceeding RTAS '97 Proceedings of the 3rd IEEE Real-Time Technology and Applications Symposium (RTAS '97), p. 1-11 (Year: 1997).

Baker et al., "GridRM: A Resource Monitoring Architecture for the Grid", published by Springer-Verlag Berlin Heidelberg 2002, pp. 268-273 (Year: 2002).

Non-Final Rejection for U.S. Appl. No. 16/129,520, notification date Oct. 10, 2019, 17 pages.

USPTO issued prosecution documents for U.S. Appl. No. 16/129,520, dated Sep. 12, 2018, including: Advisory Action and Examiner

(56) References Cited

OTHER PUBLICATIONS initiated interview summary (PTOL-413B) dated May 19, 2020, 5 pages; Applicant Initiated Interview Summary (PTOL-413) dated May 14, 2020, 6 pages; Non-Final Rejection dated Apr. 17, 2020, 14 pages; Applicant Initiated Interview Summary (PTOL-413) dated Dec. 10, 2019, 5 pages; 30 pages total.
Notice of Allowance for Korean Patent Application No. 10-2017-0133554, dated Mar. 9, 2020, 3 pages.

* cited by examiner

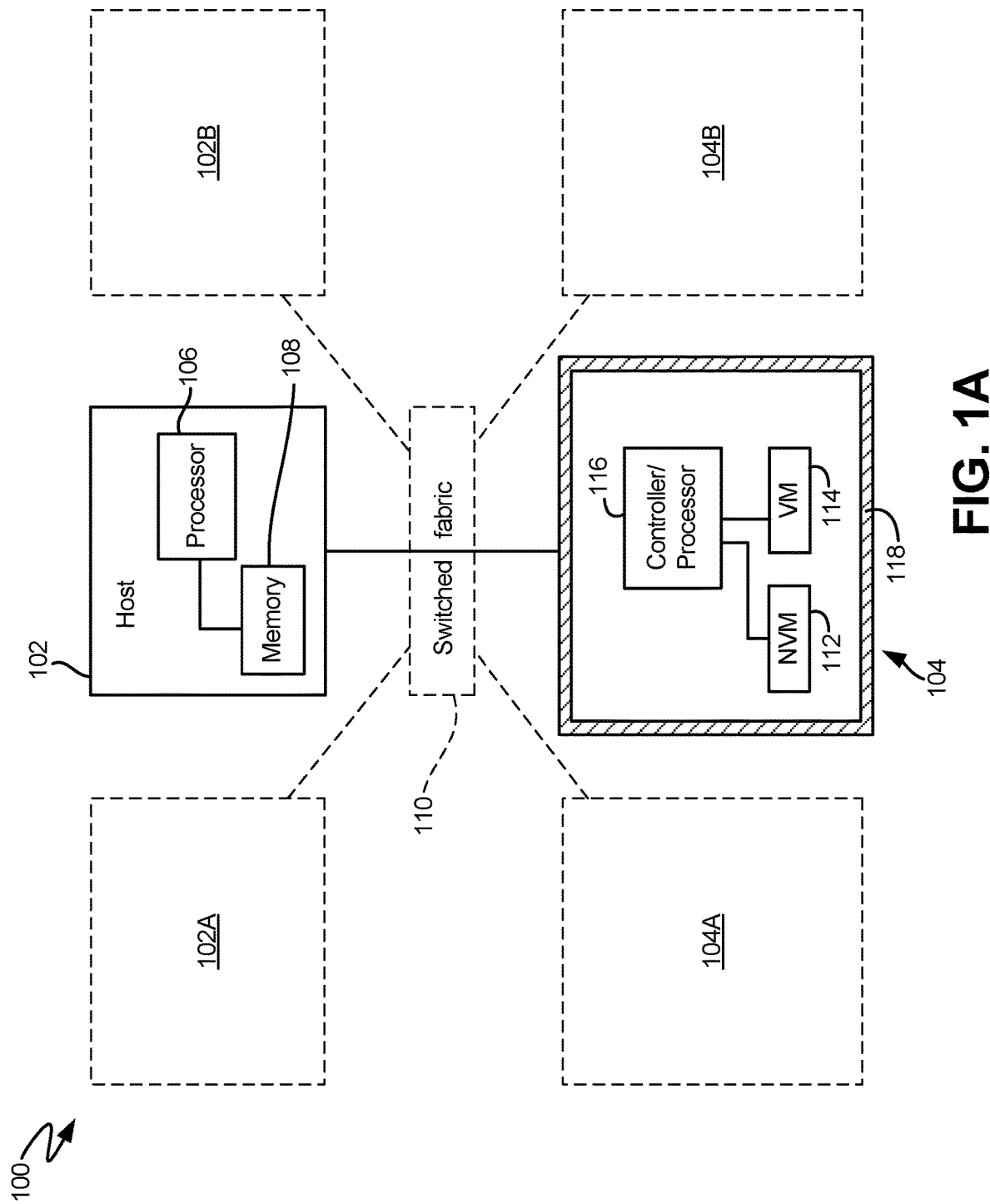

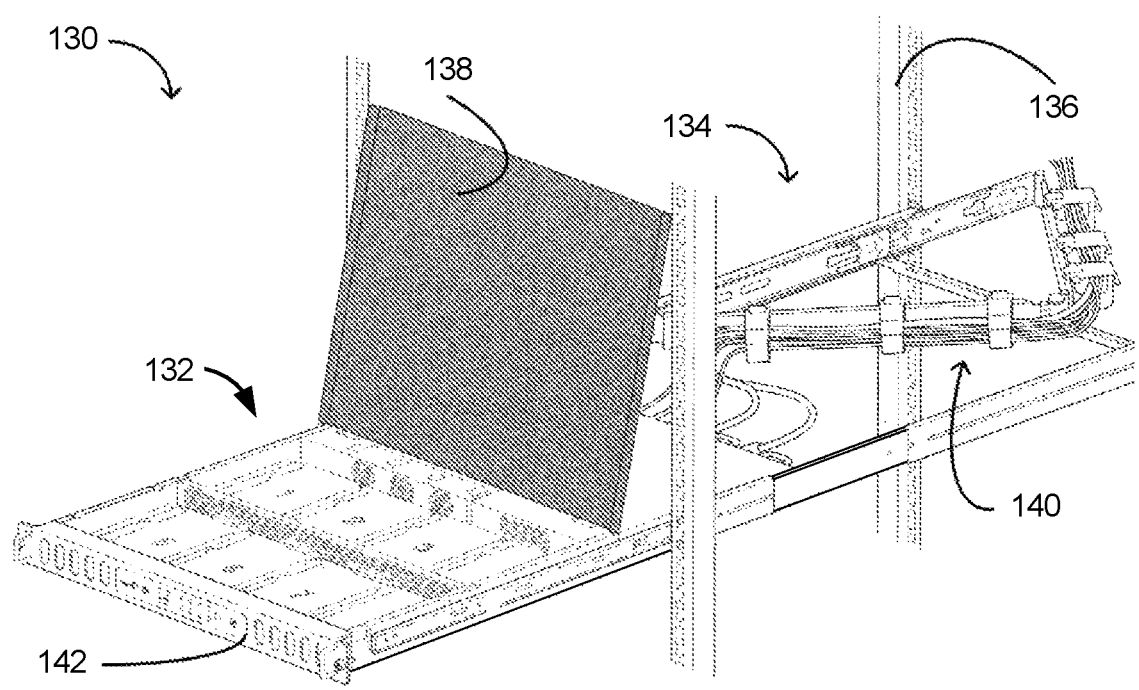
FIG. 1AAA

ACTIVE DRIVE

CROSS-REFERENCE TO RELATED APPLICTIONS

This utility patent application claims the benefit of U.S. Provisional Patent application No. 62/408,446, filed on Oct. 14, 2016, the entire content of which is hereby incorporated by reference, and this utility patent application makes reference to U.S. patent application Ser. No. 15/378,995, filed on even date herewith, which issued as U.S. Pat. No. 10,613,882 on Apr. 7, 2020, the entire content of which is hereby incorporated by reference.

BACKGROUND

Data storage drives are typically included in systems having one or more host computers. Examples of data storage drives include hard disk drives (HDDs), which are electromechanical devices containing spinning discs and movable read/write heads, solid state drives (SSDs), which use memory chips and contain no moving parts, and hybrid drives, which combine features of HDDs and SSDs in one unit.

In current systems, data are read and sent from a data storage drive to a host computer. Data are then processed within the host's computation environment.

SUMMARY

The present disclosure relates to a data storage drive that includes components that enable execution of applications in the data storage drive.

In one embodiment, a data storage drive (sometimes referred to herein as an Active Drive) includes a data storage medium and a drive control circuit communicatively coupled to the data storage medium. The data storage drive also includes embedded application-execution circuitry that executes an application, stored in the data storage drive as one or more key-value objects, within a controlled environment of the data storage drive.

This summary is not intended to describe each disclosed embodiment or every implementation of the Active Drive. Many other novel advantages, features, and relationships will become apparent as this description proceeds. The figures and the description that follow more particularly exemplify illustrative embodiments.

BRIEF DESCRIPTION OF THE DRAWINGS

FIG. 1AA is an exploded view of a DSD in accordance with one embodiment.

FIG. 1AAA is a perspective view of a portion of a storage rack including a storage compartment in which multiple DSDs may be installed.

FIG. 2AA is a block diagram of an example HDD that includes embedded application-execution circuitry in accordance with another embodiment.

DETAILED DESCRIPTION

Embodiments described below relate to a data storage drive or data storage unit that includes components that enable execution of applications (e.g. an applet or small application) within the drive or data storage unit. Such a data storage drive is sometimes referred to herein as an Active Drive. Prior to providing details regarding the Active Drive, a description of an illustrative operating environment is provided below.

Figure 1A:
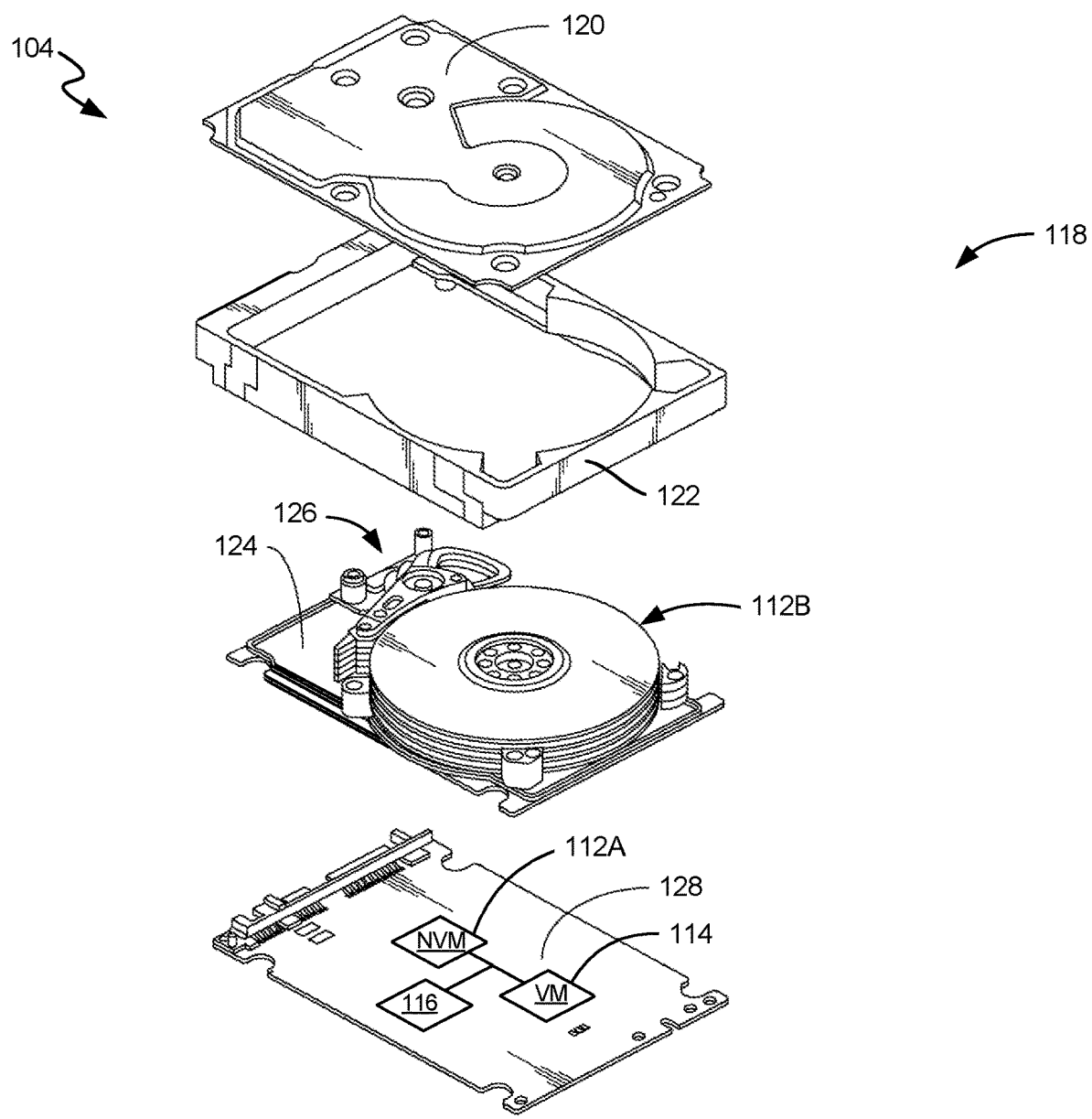
FIG. 1A is a block diagram of a system including at least one host and a data storage drive (DSD) in accordance with one embodiment.

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments. It should be noted that the same reference numerals are used in different figures for same or similar elements.

FIG. 1A depicts a system 100 that may include at least one host 102 and at least one data storage drive (DSD) 104, communicatively coupled, such as by switched fabric network 110. The host 102 is generally an electronic device with computing capability that utilizes separately stored data to perform one or more tasks. The host 102 may also be referred to as the host system or host computer. The host 102 can be one or more computers or similar electronic devices, such as a supercomputer, a desktop computer, a laptop computer, a server, a tablet computer, a communication system, a music player, another electronic device, or any combination thereof. Host 102 may include a processor 106 (e.g. a central processing unit) and a memory 108 (e.g. a system memory that includes read only memory (ROM), random access memory (RAM), etc.), which is communicatively coupled to processor 106. Computer-executable instructions may be stored in memory 108 before being executed by processor 106.

As indicated earlier, DSD 104 may be a hard disk drive (HDD), which is an electromechanical device containing spinning data storage discs and movable read/write heads, a solid state drive (SSD), which uses electronic memory chips (e.g. one or more solid-state Flash memory chips) and contains no moving parts, or a hybrid drive, which combines features of HDDs and SSDs in one unit. Thus, DSD 104 may include nonvolatile media 112 (e.g. one or more data storage discs, one or more Flash memory chips, phase change memories, resistive RAMs, magnetic RAMs, carbon nanotube memories, etc.), volatile memory 114 such as random access memory, and one or more processors 116. In general, as used herein, a data storage medium refers to a non-transitory computer-readable data storage medium that is tangible. Computer-executable instructions may be stored on nonvolatile media 112 and in volatile memory 114 before being executed by the processor(s) 116. The processor(s) 116, nonvolatile media 112 and volatile memory 114 are used to perform the DSD's basic storage operations (e.g. storing user data) and also include firmware and software that provide an application-execution environment within DSD 104. Portions of processors 116, nonvolatile media 112 and/or volatile memory 114 that provide the DSD's basic storage operations form a drive control circuit, and portions of elements 116, 112 and/or 114 the provide application-execution functionality form embedded application-execution circuitry. The nonvolatile media 112, the volatile memory 114 and the processor(s) 116 are contained in a mechanical assembly, such as casing 118. In some embodiments, host 102 and DSD 104 may both be part of a single unit, such as a storage rack (e.g. the entire DSD 104 with its casing 118 is installed within a storage enclosure also containing host 102). In other embodiments, DSD 104 and host 102 may be spaced apart, and DSD 104 may even be remotely located from the host 102. One example of a DSD 104 having a casing such as 118 is briefly described below in connection with FIG. 1AA.

FIG. 1AA provides an exploded view of a HDD 104 with an example casing or housing 118. As shown, the housing 118 includes a top cover 120, a base-deck frame 122 and a base-deck floor 124. In the embodiment shown in FIG. 11A, base-deck frame 122 and base-deck floor 124 are two separate pieces. However, in other embodiments, base-deck frame 122 and base-deck floor 124 may be a single piece. The housing 118, including the base-deck frame 122, base-deck floor 124 and the top cover 120, may adhere to any of a number of different form factors, including, for example, the 2.5" and 3.5" form factors for HDDs. The housing 118, in combination with HDD internals 126 and a logic board 128 provide the HDD 104. As can be seen in FIG. 1AA, processors 116, first nonvolatile media 112A, and volatile memory 114 are included on board 128. First nonvolatile media 112A may comprise electronic memory that may be used as a nonvolatile cache memory in some embodiments. Also, nonvolatile media 112A may include memory that stores firmware and software that helps provide an application-execution environment in HDD 104. Storage discs, which are a part of HDD internals 126, constitute second nonvolatile media 112B, which together with first nonvolatile media 112A make up nonvolatile media 112 (of FIG. 1A).

Referring back to FIG. 1A, it is seen that there may be multiple DSDs (e.g. 104, 104A, 104B, etc.) in a system such as 100. The multiple DSDs 104, 104A, 104B, etc., which may each be separately housed in a casing such as 118 shown in FIG. 1AA, may be installed in a storage rack. One example of a storage rack is briefly described below in connection with FIG. 1AAA.

FIG. 1AAA provides a perspective view of a portion of a storage rack 130 including a storage compartment 132 in which multiple DSDs (e.g., 104, 104A, 104B, etc.) of the type shown in FIGS. 1A and 1AA may be installed. As illustrated, storage rack 130 may include a rail assembly 134 that enables the storage compartment 132 to be drawn out of rack 136 (e.g., 19-inch rack), and a storage compartment cover 138 may be raised providing easy access to storage compartment 132. The storage compartment 132 may include a number of bays for a number of DSDs (e.g., 104, 104A, 104B, etc., of FIG. 1A) such as HDDs (e.g., 3.5-inch HDDs), SSDs, hybrid drives, etc. As further illustrated in FIG. 1AAA, rail assembly 134 may further include a cable management system 140 for managing one or more cables connected to an appropriate electrical connector or hardware interface on a motherboard at a rear end (opposite a faceplate 142) of the storage compartment 132. In the embodiment of FIG. 1AAA, any of DSDs 104, 104A, 104B, etc., of FIG. 1A, which may wear out or malfunction during the expected system lifetime, may be easily replaced by a technician.

As described earlier in connection with the embodiments of FIGS. 1A and 1AA, the processor(s) 116, nonvolatile media 112 and volatile memory 114 are contained within housing 118 of an individual DSD 104 and perform both the DSD's basic storage operations and provide an application-execution environment within DSD 104. However, in some embodiments (shown in FIGS. 1B and 1C), components within housing 118 (e.g. processor(s) 116, nonvolatile media 112 and volatile memory 114) may primarily be configured to provide basic storage operations, and an application-execution component 117 may be included outside housing 118 to provide an application-execution environment for applets that may utilize data within DSD 104. The application-execution component 117 may include a combination of one or more microprocessors, memory and firmware that enables installation and execution of applets. In such embodiments, application-execution component(s) 117 may be included within a storage compartment such as 132 (of FIG. 1AAA), which houses a plurality of DSDs. It should be noted that application-execution component 117 is not a part of any host computer. Instead, it is part of the data storage unit. This arrangement has many benefits. One benefit is that large data transfers across switched fabric 110 are avoided while performing data reduction operations. Data are processed locally without having to utilize switched fabric 110 except for managing operations and collecting results. Another benefit is that the amount of application-execution capability scales directly with storage. Users who add storage to their system automatically get a corresponding amount of local processing capability.

The compartment such as 132 that houses the plurality or group of DSDs is sometimes referred to herein as a data storage unit. Within the compartment such as 132, each DSD of the group of DSDs may have its own casing 118, and the group of DSDs and the application-execution component(s) 117 are together housed within an outer casing of the compartment such as 132.

Figure 1B:
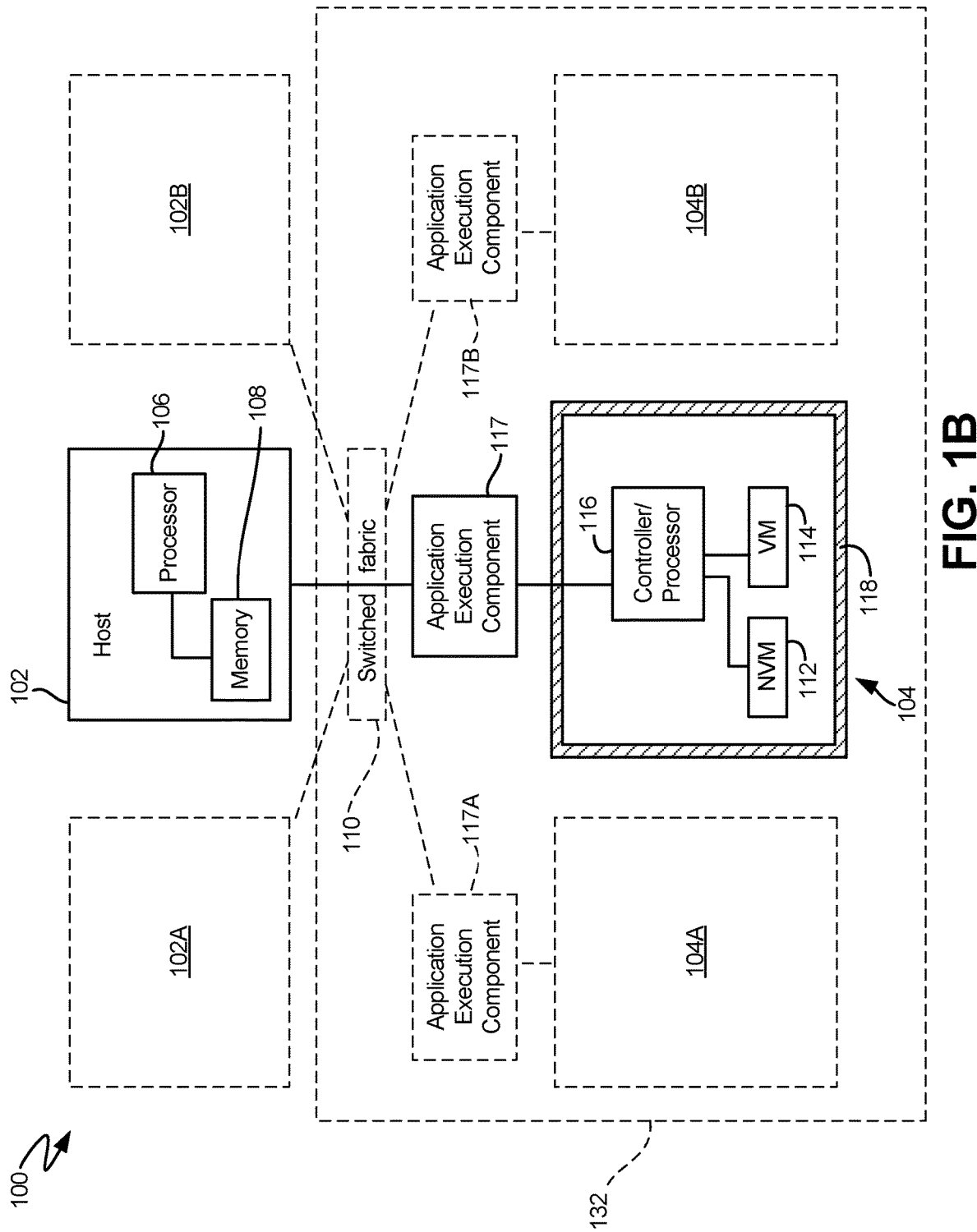
FIG. 1B is a block diagram of a system including at least one host and a data storage unit having multiple DSDs in accordance with one embodiment.

In some embodiments, a separate application-execution component may be coupled to each individual DSD. Such an embodiment is shown in FIG. 1B. In the embodiment of FIG. 1B, application-execution component 117 is coupled to DSD 104 via a suitable interface and provides an application-execution environment for applets stored within DSD 104. Similarly, application-execution component 117A is coupled to DSD 104A and application-execution component 117B is coupled to DSDs 104B. Components 117A and 117B provide application-execution environments for applets stored within DSDs 104A and 104B, respectively.

Figure 1C:
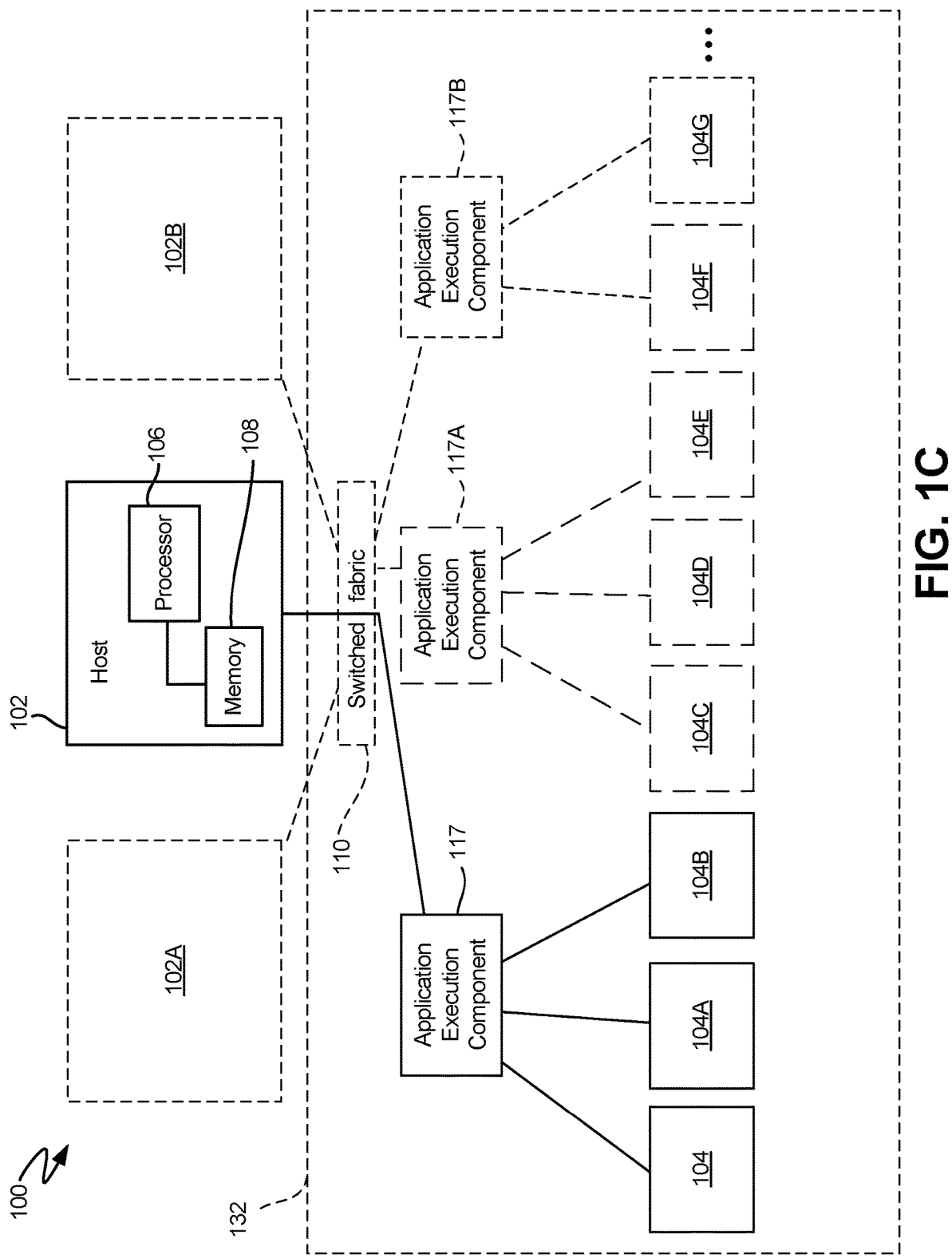
FIG. 1C is a block diagram of a system including at least one host and a data storage unit having multiple DSDs in accordance with another embodiment.

In an alternate embodiment, one application-execution component may be coupled to multiple DSDs. Such an embodiment is shown in FIG. 1C. In the embodiment of FIG. 1C, application-execution component 117 is coupled to DSDs 104, 104A and 104B, application-execution component 117A is coupled to DSDs 104C, 104D and 104E, and application-execution component 117B is coupled to DSDs 104F and 104G. In this embodiment, application-execution component 117 provides an application-execution environment for applets stored within DSDs 104, 104A and 104B. Similarly, applets stored in DSDs 104C, 104D and 104E can be executed by application-execution component 117A, and applets stored in DSD 104F and 104G can be executed by application-execution component 117B.

In general, for the above-described embodiments, any suitable optical, wired, or wireless connection techniques may be utilized to connect the different components of system 100. In some embodiments, a network switched fabric (denoted by reference numeral 110 in FIGS. 1A, 1B and 1C) may be included to provide communication amongst the different components. In the interest of simplification, example connection techniques are described below for the configuration shown in FIG. 1A, and do not include a description of connections to application-execution component 117 of FIGS. 1B and 1C. However, it should be noted that the examples provided below also apply to the configurations shown in FIGS. 1B and 1C.

As indicated above, the host 102 and DSDs 104, 104A, 104B, etc., may be connected by way of an optical, wired, or wireless connection, for example by a local area network (LAN) or wide area network (WAN). In some embodiments, DSD 104 may be connected to multiple host computers 102, 102A, 102B, etc., by way of a LAN or WAN. An example may include an Ethernet network allowing access by multiple clients simultaneously. In some embodiments, the DSDs 104, 104A, 104B, etc., may connect to the hosts 102, 102A, 102B, etc., over one or more interfaces simultaneously. For example, DSDs 104, 104A, 104B, etc., may have multiple Ethernet interfaces to connect to hosts 102, 102A, 102B, etc. In other embodiments, DSDs 104, 104A, 104B, etc., may have a single interface connected to multiple hosts such as 102, 102A and 102B. For example, switched fabric 110 may be used to regulate access between multiple hosts 102, 102A and 102B. Devices, such as the DSD 104 and hosts 102, 102A, 102B, etc., may have Internet Protocol (IP) addresses that can be accessed locally or over an internet. In some embodiments, the DSD 104 may be able to access other DSDs 104A, 104B, etc., on the network in addition to host devices 102, 102A and 102B.

Conventional storage interfaces, such as SAS, SATA, and NVMe may also be used to communicate between host 102 and DSD 104. Mixtures of interfaces and protocols are possible. For example, SCSI commands may be sent to and from a host 102 over an Ethernet network, to an Ethernet port attached to a processor via a PCIe bus (not shown). The processor may then send the commands onwards over a PCIe bus to a SAS host bus adapter, which sends the command over a SAS link to DSD 104.

In embodiments of the disclosure, applets that originate from host 102 may be stored in DSD 104. As will be described in detail further below, each of the applets may be organized as a set of key-value objects. The set of key-value objects (e.g. one or more key-value objects that constitute the application) is referred to herein as an applet object. Both key-value objects and applet objects are described in detail further below.

DSD 104 (of FIG. 1A) and application-execution component 117 (of FIGS. 1B and 1C) support an Active Drive application programming interface (API). Host 102 utilizes the Active Drive API to install and execute the applet object(s) in DSD 104 (of FIG. 1A) and in application-execution component 117 (of FIGS. 1B and 1C). Although, in some embodiments, the Active Drive API is object-based, the use of an object-based API is not limiting. For example, in alternate embodiments, DSD 104 may use files or linked lists of logical block addresses instead.

Examples of interfaces over which host 102 and DSD 104 may communicate to store and execute applet objects include an Ethernet, SAS, SATA, or PCIe connection. In some embodiments, Active Drive API commands may be translated or encapsulated into other command protocols, such as SAS, SATA, NVMe, etc., by a translation or shim layer or bridge controller (not separately shown in FIGS. 1A, 1B and 1C). In other embodiments, the Active Drive API commands can be converted directly into low-level operations to control the DSD 104 functions. Contents of an example key-value object and applet object are described below.

Figure 1D:
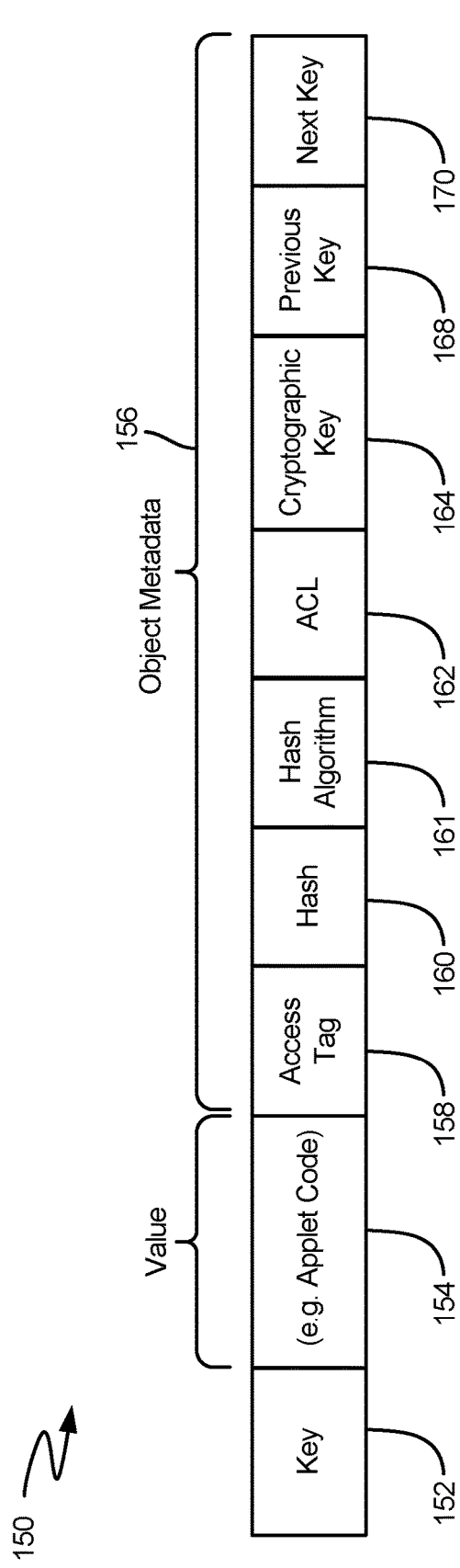
FIG. 1D is a block diagram illustrating an example structure of an object that may be stored in a DSD of the system of FIG. 1A or in the data storage units of FIGS. 1B and 1C.

FIG. 1D depicts an example of fields that may be associated with a key-value object, which may be referred to herein simply as an "object." Each object 150 may comprise a key 152, which identifies the object. Object 150 may also comprise a value 154, which may be data associated with the key received from a client or host (e.g. user data, executable application code or intermediate object code). Object 150 may also comprise metadata 156, which may include a set of attributes associated with the object 150, identify access rights, or identify other nearby objects for example.

The metadata 156 may include fields such as an access tag or "version" field 158 used to control access to the object 150, which can keep the object synchronized when multiple clients may have simultaneous access with asynchronous connections. In some embodiments, an object's metadata 156 may also include a hash 160 of the object code, a hash algorithm 161 used to create the hash 160, cryptographic keys 164, an access control list (ACL) 162 to designate access rights (e.g. to designate which clients can access the object), identifiers for a next 170 or previous 168 object, e.g. according to a collation order based on the values of the keys, or other related information.

As specified, an access control list (ACL) may limit which clients or hosts can access an object, and may limit the performance of any action at all by a client or a host on an object. In some embodiments, an ACL may be maintained for each object, listing the clients or hosts with access permissions. In some embodiments, DSD 104 may maintain an ACL for each client or host designating which key ranges or objects the client or host has access to. In some embodiments, DSD 104 may maintain ACLs linking clients or hosts and associated accessible objects.

Figure 1E:
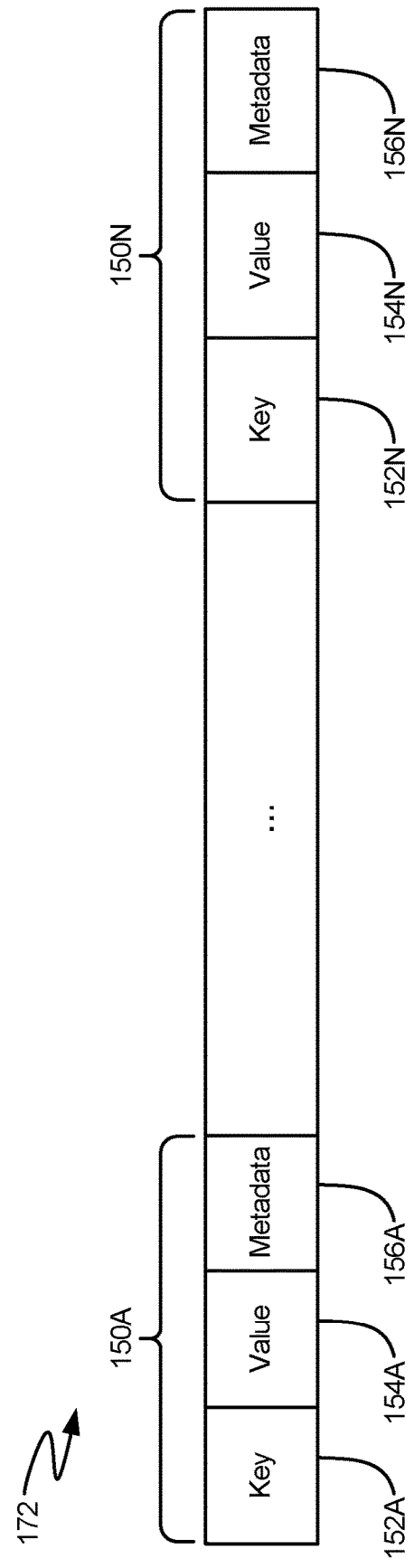
FIG. 1E is a block diagram illustrating an example structure of an applet object that may be stored, installed and executed in a DSD of the system of FIG. 1A or in the data storage units of FIGS. 1B and 1C.

As noted above, the set of key-value objects that constitutes the applet is referred to herein as an applet object. FIG. 1E is a diagrammatic illustration of one example of an applet object 172. In the Example shown in FIG. 1E, applet object 172 is a sequence of N key-value objects. A first of the N key-value objects is denoted by 150A and includes key 152A, value 154A and metadata 156A. The last or $n^{th}$ key-value object is denoted by 150N and includes key 152N, value 154N and metadata 156N. Keys 152A through 152N may be generated in any suitable manner. For example, in some embodiments, each key 152A, . . . , 152N may be independently generated. In other embodiments, keys other than first key 152A may be generated by, for example, adding a suitable suffix to key 152A. In some embodiments, an algorithm may utilize first key 152A as an input and generate the remaining keys as a function of the first key 152A. Based on the key generation technique used, applet object 172 may be known or identified by a list of all the keys 152A through 152N, or be identified by first key 152A, which may serve as a root or handle for the applet object 172.

As noted earlier in connection with FIG. 1D, an ACL may limit which clients or hosts can access an object. Since applet object 172 may include multiple objects, each of the multiple objects 150A thorough 150N, may include either the same ACL metadata or different ACL metadata. In some embodiments, the ACL for the applet object 172 is dictated by the ACL metadata of the first object 150A of the applet object 172, and the ACL metadata for the remaining objects of the applet object 172 are ignored. In an alternate embodiment, the ACL metadata of all objects 150A through 150N of the applet object 172 are taken into consideration to determine host or client access to the applet object 172. In a particular embodiment, access to the applet object 172 is limited to hosts or clients that have access to every one of objects 150A through 150N of the applet object 172. In general, any suitable technique may be utilized to control host or client access to the applet object 172. An example of application-execution circuitry that is embedded in a HDD and provides an execution environment for an applet object such as 172 is described below in connection with FIG. 2A.

Figure 2A:
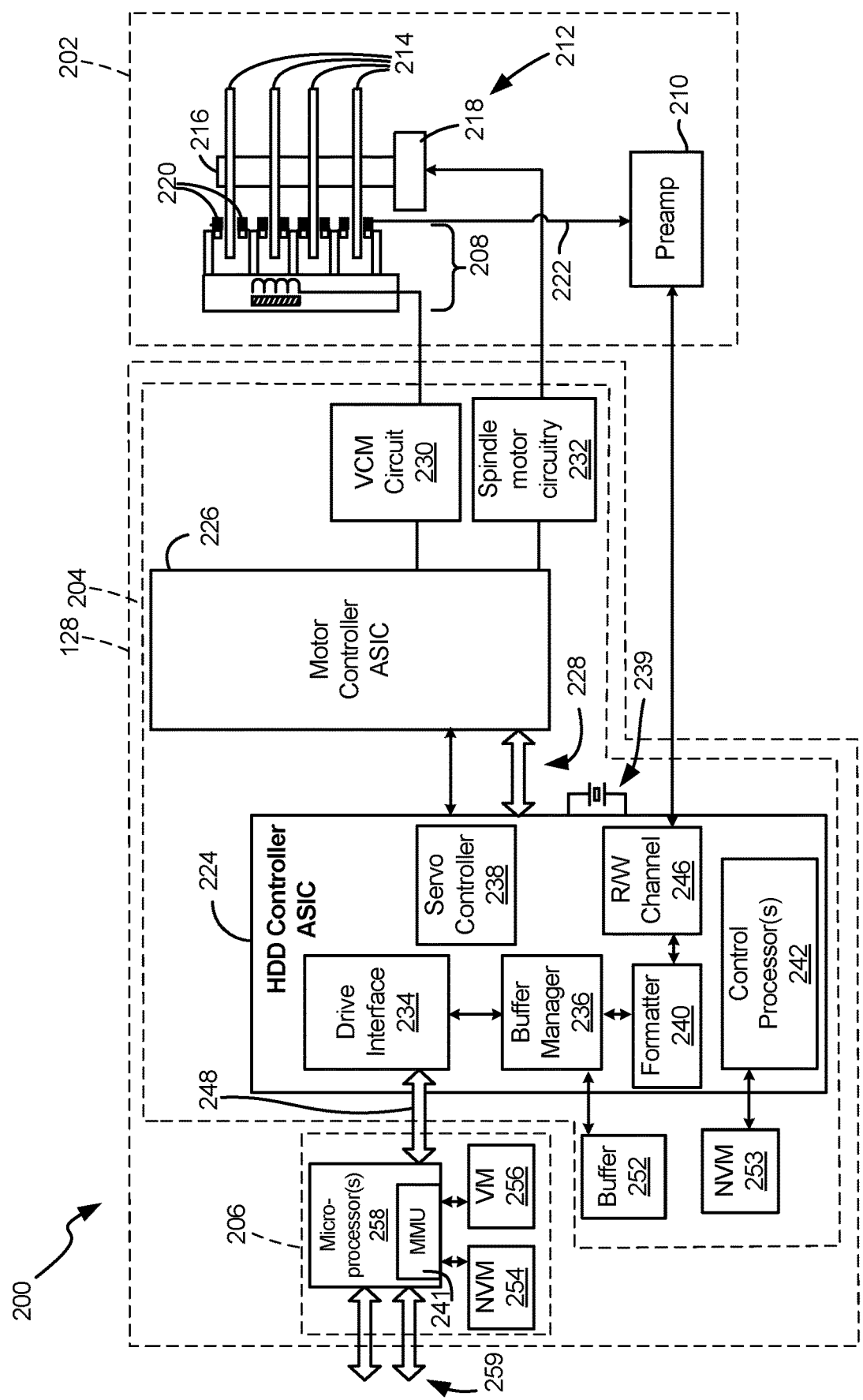
FIG. 2A is a block diagram of an example hard disk drive (HDD) that includes embedded application-execution circuitry in accordance with one embodiment.
Figure 2A:
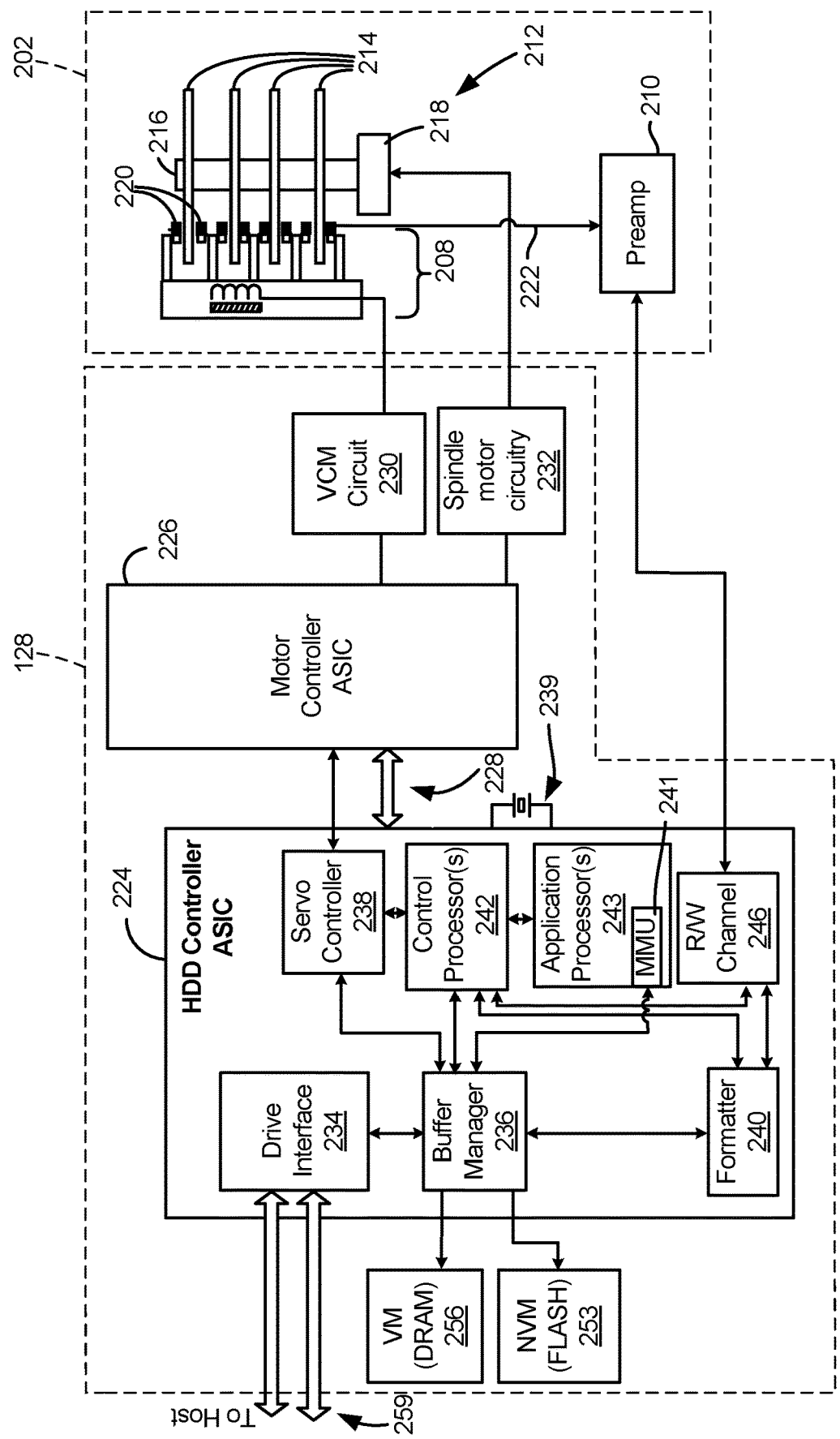

FIG. 2A is a block diagram of an example HDD 200 that includes embedded application-execution circuitry in accordance with one embodiment. HDD 200 includes a logic board 128 and a head-disc assembly (HDA) 202. Logic board 128 includes a drive control circuit 204, which helps provide the HDD's basic storage operations, and embedded application-execution circuitry 206, which provides an application-execution environment in HDD 200.

HDA 202 includes an actuator assembly 208, a preamplifier 210, and a disc assembly 212. Disc assembly 212 includes one or more media discs 214, stacked on a spindle assembly 216. Spindle assembly 216 is mechanically coupled to a spindle motor 218 for rotating the disc(s) 214 at a high rate of speed.

Actuator assembly 208 includes a voice coil motor (VCM), and multiple actuator arms. Located at the end of each actuator arm are one or more sliders/transducer heads such as 220, which are associated with a respective disc surface. Transducer heads 220 are coupled to preamplifier 210 via any suitable connection element 222.

In the embodiment of FIG. 2A, drive control circuit 204 includes a HDD controller application specific integrated circuit (ASIC) 224 and a motor controller ASIC 226 that are coupled together via a connection element 228. VCM drive circuitry 230 and spindle motor drive circuitry 232 are coupled to motor controller ASIC 226.

HDD controller ASIC 224 includes a drive interface 234, a buffer manager 236, a servo controller 238, a formatter 240, control processors 242, and a read/write channel 246. Drive interface 234 may be coupled to a bus connector (e.g., a SATA interface) 248 and communicates, via the bus connector 248, by receiving commands and data from and transmitting status and data back to, for example, embedded application-execution circuitry 206. Drive interface 234 may manage a queue of commands received from a host and/or application-execution circuitry 206. Drive interface 234 is connected to buffer manager 236 for transfer of commands, data, and status.

Buffer manager 236 controls a buffer memory 252, which may include volatile and/or nonvolatile electronic memory. Under the control of buffer manager 236, data from buffer memory 232 is provided to formatter 240, which provides the data in a suitable format to read/write channel 246, which communicates with HDA 202 to store the data on disc(s) 214. Also, data read from the disc(s) 214 is provided to formatter 240 via read/write channel 246.

In the embodiment of FIG. 2A, control processors 242 execute drive operational programs that may be stored in nonvolatile program storage memory 253, such as read-only memory (ROM) or Flash memory. In the interest of simplification, details regarding the drive operational programs are not provided.

Servo controller 238 provides intelligent control of actuator assembly 208 and spindle motor 218 through motor controller ASIC 226. By commands issued to motor controller ASIC 226 by servo controller 238, VCM driver circuitry 230 moves actuator assembly 208 and spindle motor drive circuitry 232 maintains a substantially constant spin rate of spindle motor 218. A crystal oscillator circuit 239 may be included in HDD 200 to provide a substantially stable clock signal for operating HDD 200.

During operation of HDD 200, transducer heads 222 communicate with drive control circuit 204 via preamplifier 210 for reading and writing data to the transducer head's associated disc surface. Preamplifier 210 provides an amplified signal to read/write channel 246 of drive control circuit 204. Read/write channel 246 performs encoding and decoding of data written to and read from the disc(s) 214.

HDD 200 is capable of storing user data as key-value objects and is also capable of storing applet objects. Additionally, HDD 200 provides an environment in which the applet objects may be executed. In the embodiment shown in FIG. 2A, such an application-execution environment is provided within HDD 200 by embedded application-execution circuitry 206. Embedded application-execution circuitry 206 includes memory (e.g. electronic memory) for storing firmware and software that includes instructions that support the execution of applications in HDD 200. Further, embedded application-execution circuitry 206 includes one or more processors that execute the instructions stored in the memory within embedded application-execution circuitry 206. In the embodiment of FIG. 2A, embedded application-execution circuitry 206 includes nonvolatile memory 254 (e.g. one or more data storage discs, one or more Flash memory chips, phase change memories, resistive RAMs, magnetic RAMs, carbon nanotube memories, etc.) and volatile memory 256 (e.g. dynamic random access memory (DRAM)), which are both coupled to a microprocessor 258. In a particular embodiment, microprocessor 258 is a dual-core microprocessor. However, in alternate embodiments, other processor core counts, such as single or four-core microprocessors 258, may be employed. In some embodiments, Microprocessor(s) 258 may comprise an application processor designed for embedded-systems (e.g. a Cortex-A53 from ARM Corporation) rather than, for example, a larger desktop computer processor (e.g. an i7 from INTEL™ corporation) to limit power consumption.

Microprocessor 258 may further comprise a means of limiting an applet's range of access to microprocessor's 258 resources such as memory management unit (MMU) 241. The MMU 241 provides the ability to limit the range of access to microprocessor 258 resources by a running computer program, such as an applet, via hardware circuitry. As mentioned above, the HDD 200 provides an environment in which an applet object may be executed. The drive's applet management firmware in an object manager daemon, which is described further below, allocates a range of memory (e.g. volatile memory 256) for applet execution and configures the MMU 241 to establish that range via circuitry. This may be done by running the applet in a less-privileged protection ring than the object manager daemon, for example by running the applet in user mode and the daemon in supervisor mode. If the applet attempts to access resources outside of its allocated range, for example due to bugs or in an attempt of malicious hacking, the MMU 241 prevents this access and generates an interrupt to the object manager daemon supervisory program running in microprocessor 258. The object manager daemon supervisory program responds to this interrupt. Responses can include terminating the applet and returning a status message back to the host 102 indicating that the applet did not complete successfully.

In an alternate embodiment, the applet's range of access to microprocessor 258 resources can be limited by executing the applet in a virtual environment, such as a Java virtual machine or a low-level virtual machine such as LLVM. These systems interpret (instead of directly execute) the intermediate representation of a compiled applet, such as the applet's bytecode/bitcode and limit access to resources programmatically.

The MMU 241 can also be used for applet memory paging control. For example, software at a higher privilege, such as the operating system or the object manager daemon, using MMU 241, can detect when an applet attempts to access a valid address range, but one that is not currently mapped into volatile memory (e.g. volatile memory 256). The operating system or object manager daemon can then swap pages between volatile memory (e.g. volatile memory 256) and disk 214 (or other memory (e.g. nonvolatile memory 254)) to provide the applet with an effectively larger memory space (from the applet's perspective).

In the embodiment shown in FIG. 2A, embedded application-execution circuitry 206 is coupled to drive control circuit 204 via SATA interface 248. In an alternate embodiment, microprocessor(s) 258 may be incorporated within HDD controller ASIC 224. Such an embodiment eliminates SATA interface 248. As can be seen in FIG. 2A, HDD 200 includes one or more interfaces 259 (e.g. Ethernet interfaces) to connect to external devices. In some embodiments, the connection to the external devices takes place via a network.

FIG. 2AA describes an embodiment similar to the embodiment of FIG. 2A, but with a key differences in the HDD controller ASIC design. In FIG. 2AA, the application processor 243 is integrated as part of HDD controller ASIC 224. By integrating application processor 243 into ASIC 224, the volatile memory 256 and non-volatile memory 254, included with the external microprocessor 258 in FIG. 2A are eliminated. This is made possible by adding an additional client to the buffer manager 236 from application processor 243, and allocating space for the application processor's volatile and non-volatile memory in the drive's volatile memory 256 and non-volatile memory 253 components. The data flow in FIG. 2AA also differs from FIG. 2A. In FIG. 2AA, host commands flow directly through drive interface 234 into volatile memory (such as DRAM) 256, before being serviced by application processor 243. Application processor 243 commands basic disk storage operations by communicating with control processor 242. The remainder of the disk system in FIG. 2AA is substantially similar to FIG. 2A.

Figure 2B:
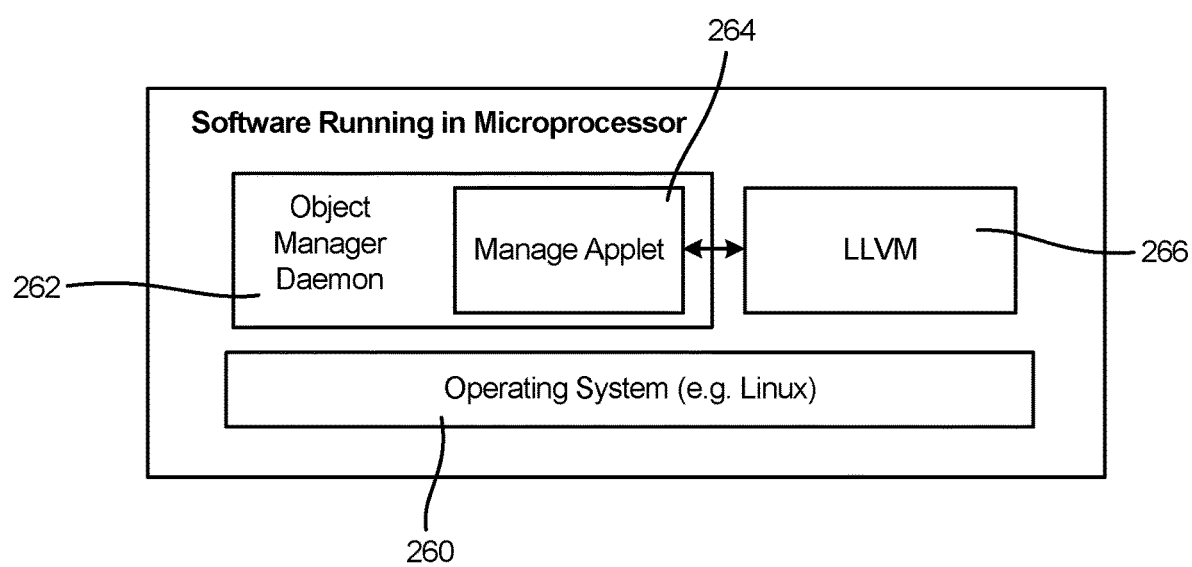
FIG. 2B is block diagram showing firmware and/or software components that may be run in one or more microprocessors of the HDDs of FIGS. 2A and 2AA and in application-execution components of FIGS. 1B and 1C.

FIG. 2B is a block diagram showing firmware and/or software components that may be run, for example, in microprocessor(s) 258 of FIG. 2A to carry out object storage-related tasks and to provide an application environment for running applet objects. Software that is run in microprocessor(s) 258 to support object storage-related tasks may include an operating system 260, such as Linux, and an object manager daemon 262. The object manager daemon 262 performs substantially all of the object storage-related tasks, such as object management (executing, for example, object storage commands, object retrieval commands, object deletion commands, etc.), object access control, etc.

To carry out applet execution, software that is run in microprocessor(s) 258 also includes an API, which is denoted by reference numeral 264 and referred to herein as Manage Applet, and a low-level virtual machine (e.g. LLVM® from the University of Illinois/LLVM Foundation Corporation) 266. The Manage Applet API 264 includes commands that enable a computer program or applet to be sent from a host into object management daemon 262 of HDD 200 for execution. When invoked, the applet is loaded into the low-level virtual machine 266 for execution.

In the embodiment of FIGS. 2A and 2B, the low-level virtual machine 266 is a separate software component that creates a virtual environment for running a computer program or applet. In a particular embodiment, a CLANG™/LLVM® system 266 may be utilized. However in alternate embodiments, other virtual environments, such as JAVA® from Oracle America Inc. and Docker/Container from Docker Inc., for example, may be employed as element 266.

In one embodiment, the low-level virtual machine comprises two portions, with one of the two portions being low-level virtual machine 266 in HDD 200. The other low-level virtual machine portion is external to the HDD 200 and includes a compiler that is utilized to pre-compile the applet into an object code. An example compiler is a CLANG™ compiler developed by the University of Illinois, Apple Inc. and others. This object code constitutes the applet object that is sent via the Manage Applet API 264 into HDD 200. The applet object may be stored in HDD 200 for later execution, or run substantially immediately within HDD 200. When the applet object is invoked by way of an Active Drive API command, for example, object management firmware in the object manager daemon 262 loads the applet object into a low-level interpreter (LLI), which is a part of low-level virtual machine portion 266 that resides in the HDD 200. The LLI interprets the applet object code (for example, a C-program) for execution.

By implementing the execution of the user' program (e.g. the applet object) within a virtual environment, exposure of the user's program (e.g. the applet object) to certain features of objects stored in HDD 200 may be prevented. For example, this allows for preventing the user's program (e.g. the applet object) from accessing portions of the design, such as the object access control, while providing support for accessing key-value objects and communicating with other drives and the host(s). In some embodiments, at least some of the software components shown in FIG. 2B may be run in application processor(s) 243 of FIG. 2AA. Further, in the embodiments of FIGS. 1B and 1C, the software components shown in FIG. 2B may be run in application-execution component(s) 117, 117A, 117B, etc., which may be included within a storage compartment such as 132 (of FIG. 1AAA).

Figure 3:
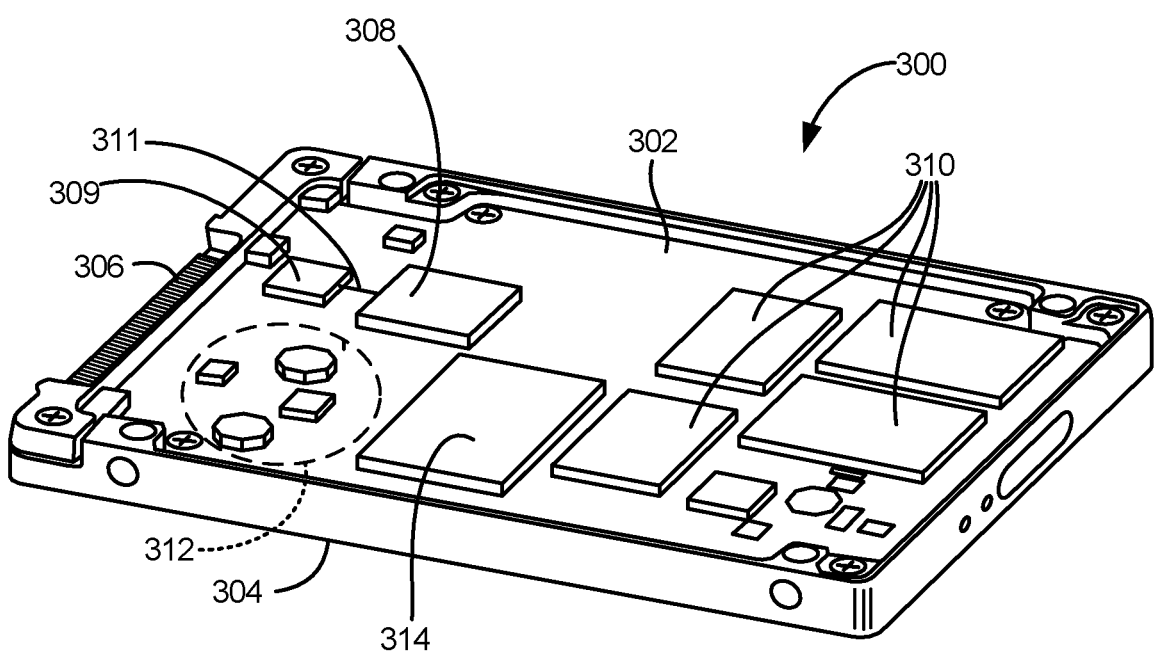
FIG. 3 is an isometric view of a solid state drive in accordance with on embodiment.

FIG. 3 illustrates an oblique view of a solid state drive (SSD) 300 in which applets may be executed. SSD 300 includes one or more circuit card assemblies 302 and typically includes a protective, supportive housing 304, a top cover (not shown), and one or more interface connectors 306. SSD 300 further includes a controller ASIC 308, embedded application-execution circuitry 309, one or more nonvolatile memory devices 310, and power regulation circuitry 312. The nonvolatile memory devices 310 are essentially the SSD's data storage media. In some applications, SSD 300 further includes a power-backup energy storage device, such as a super-capacitor 314. In the embodiment of FIG. 3, controller ASIC 308 includes circuitry that is configured to provide the SDD's basic storage operations, and application-execution circuitry 309 provides an application-execution environment in SSD 300.

In some embodiments, application-execution circuitry 309 may include hardware, firmware and software components that are similar to those included in application-execution circuitry 206 (of FIG. 2A), which is described above. Therefore, in the interest of brevity, a description of the similar components is not repeated.

In the embodiment shown in FIG. 3, embedded application-execution circuitry 309 is coupled to controller ASIC 308 via a suitable interface (e.g. a SATA interface) 311. In an alternate embodiment, processors of embedded application-execution circuitry 309, which are not separately shown in FIG. 3, may be incorporated within controller ASIC 309. Such an embodiment eliminates interface 311. As can be seen in FIG. 3, SSD 300 includes interface 306 to connect to external devices. In some embodiments, the connection to the external devices takes place via a network.

In some of the above-described embodiments of DSD 104, an executable file is generated/assembled within DSD 104 from intermediate object code that makes up the applet object. Then, the executable file may substantially immediately be run in DSD 104. In some embodiments, the executable file may also be stored/cached in DSD 104 for use on an as-needed basis. It should be noted that, in certain embodiments, an executable file generated/assembled in a device external to DSD 104 may be sent to DSD 104 from the external device by way of a suitable command and run in DSD 104. An example of an external device is host 102 of FIG. 1A.

Figure 4:
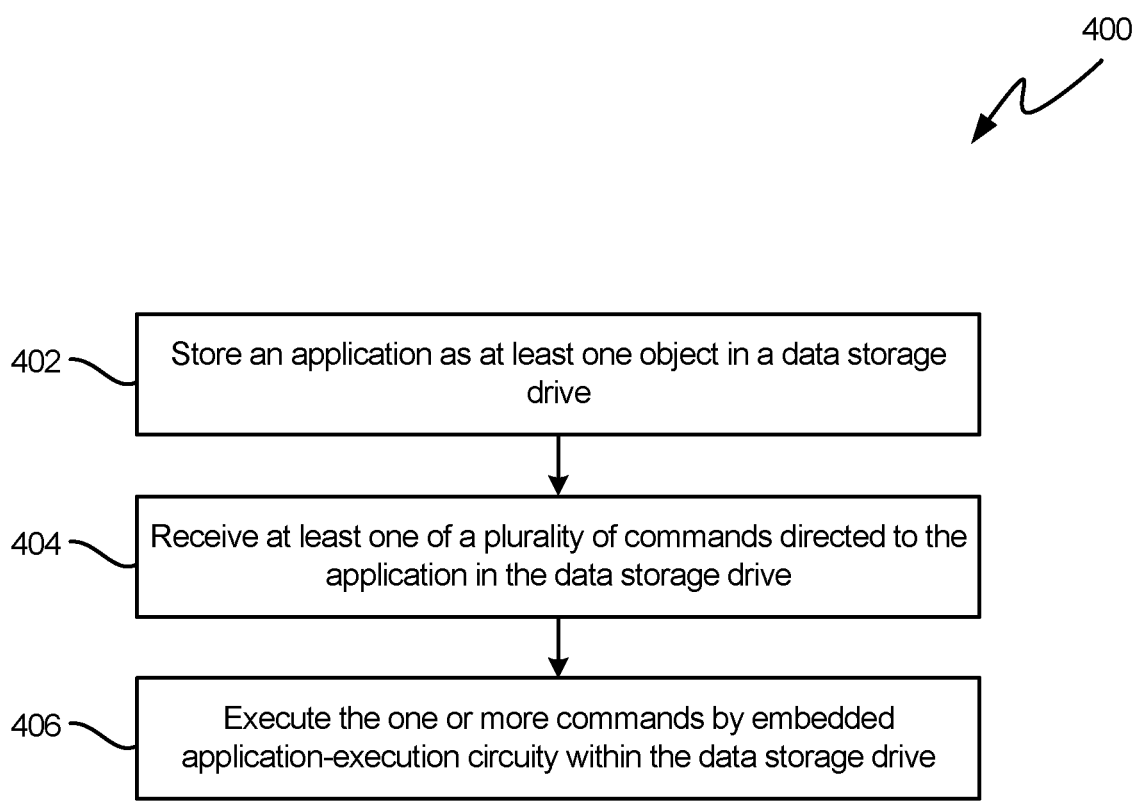
FIG. 4 is a flow diagram of a method embodiment.

FIG. 4 is a simplified flow diagram 400 of a method embodiment. At step 402, an application is stored as at least one object in a data storage drive. The at least one object includes a key to identify the object and a data field with a variable size to store the application. At step 404, at least one of a plurality of commands directed to the application is received in the data storage drive. At step 406, the one or more commands are executed by embedded application-execution circuitry within the data storage drive or within a data storage unit of the type shown in FIGS. 1B and 1C.

In accordance with various embodiments, the methods described herein may be implemented as one or more software programs running on a computer processor or controller, such as the controllers/processors described above. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage drive comprising:
   a data storage medium;
   drive control circuitry communicatively coupled to the data storage medium, the drive control circuitry is configured to store data to, and retrieve data from, the data storage medium in response to receiving commands from a host; and
   embedded application-execution circuitry configured to, in response to receiving a second active drive application programming interface command from the host, execute a user applet, stored in the data storage drive as key-value objects by a first active drive application programming interface command from the host, within a controlled environment of the data storage drive, thereby providing the data storage drive with user applet-execution functionality that is independent of, and in addition to, the data storage and retrieval functionality, and
   the first and second application programming interface commands are part of a same object-based application programming interface command set.

2. The data storage drive of claim 1 and wherein the embedded application-execution circuitry is configured to run program code that creates an environment for executing the user applet.

3. The data storage drive of claim 1 and wherein the embedded application-execution circuitry comprises a memory having stored therein commands and functions of the application programming interface, and wherein the commands and functions relate to user applet management.

4. The data storage drive of claim 1 and wherein the key-value objects comprise intermediate object code of the user applet.

5. The data storage drive of claim 4 and wherein the embedded application-execution circuitry comprises a low-level interpreter (LLI) that is configured to interpret the intermediate object code for execution.

6. The data storage drive of claim 5 and wherein the embedded application-execution circuitry comprises firmware configured to load the user applet into the LLI when the user applet is invoked.

7. The data storage drive of claim 6 and wherein the embedded application-execution circuitry is configured to, upon receipt of the key-value objects in the data storage drive, store the key-value objects in the data storage drive for subsequent execution of the user applet.

8. The data storage drive of claim 6 and wherein the embedded application-execution circuitry is configured to execute the user applet substantially immediately after receipt of the user applet in the data storage drive.

9. The data storage drive of claim 1 and further comprising one or more data storage discs, or solid state memory, configured to store user data.

10. The data storage drive of claim 1 and further comprising at least one data storage disc and solid state memory that are configured to store user data.

11. The data storage drive of claim 1 and wherein:
the drive control circuit and the embedded application-execution circuitry are integrated on a single application specific integrated circuit; or
the drive control circuit and the embedded application-management circuitry are separate components connected via an interface.

12. The data storage drive of claim 1 and further comprising:
a first memory that comprises an allocated range of memory locations for access by the user applet during execution;
a second memory;
an object manager; and
a memory management unit (MMU), and
wherein the object manager and the MMU are configured to detect an attempt by the user applet to access a valid memory address range that is not mapped into the first memory, and to responsively swap pages between the first memory and the second memory to provide the user applet with an effectively larger memory space.

13. The data storage drive of claim 1 and wherein the application execution circuitry further comprises:
an object manager; and
a microprocessor comprising a memory management unit that is configured to:
limit memory resources within the microprocessor available to the user applet when the user applet is running in the data storage drive; and
detect an attempt by the running user applet to access microprocessor memory resources outside a range of microprocessor memory locations allocated for execution of the user applet, and responsively generate an interrupt to the object manager, and
wherein the object manager is configured to terminate execution of the user applet in response to receiving the interrupt.

14. A group of data storage drives packaged as a single data storage unit, the single data storage unit comprising:
the group of data storage drives, wherein each data storage drive of the group of data storage drives comprises a non-volatile memory configured to store user data and a drive control circuit that communicates with the non-volatile memory, the drive control circuit is configured to store data to, and retrieve data from, the non-volatile memory in response to receiving commands from a host;
an outer casing that houses the group of data storage drives; and
application-execution circuitry housed within the outer casing, wherein the application-execution circuitry is configured to, in response to receiving a second active drive application programming interface command from the host, execute a user applet, installed within the single data storage unit as key-value objects by a first active drive application programming interface command from the host, within a controlled environment of the single data storage unit, thereby providing the data storage unit with user applet-execution functionality that is independent of, and in addition to, the data storage and retrieval functionality, and
the first and second application programming interface commands are part of a same object-based application programming interface command set.

15. The single data storage unit of claim 14 and wherein the application-execution circuitry is a multi-drive application-execution circuit that is coupled to multiple data storage drives of the group of data storage drives.

16. The single data storage unit of claim 14 and wherein the application-execution circuitry comprises multiple single-drive application-execution circuits, and wherein each one of the multiple single-drive application-execution circuits is coupled to a different data storage drive of the group of data storage drives.

17. The single data storage unit of claim 14 and wherein the application-execution circuitry comprises a memory having stored therein commands and functions of an application programming interface, wherein the commands and functions relate to user applet management.

18. A method comprising:
providing a data storage drive having a data storage medium, drive control circuitry and embedded application-execution circuitry;
storing, by the drive control circuitry, data to the data storage medium in response to receiving data storage commands from a host;
retrieving, by the drive control circuitry, data from the data storage medium in response to receiving data retrieval commands from the host;
receiving, by a first active drive application programming interface command from the host, intermediate object code of a user application in the data storage drive;
assembling, by the embedded application-execution circuitry, the intermediate object code of the user application as executable code of the user application in the data storage drive;
storing the executable code of the user application on the data storage medium in the data storage drive for execution in response to receiving a second active drive application programming interface command from the host, the first and second application programming interface commands being part of a same object-based application programming interface command set; and
providing, by the embedded application-execution circuitry, user application-execution functionality that is independent of, and in addition to, the data storage and retrieval functionality.

19. The method of claim 18 and further comprising storing the intermediate object code as one or more key-value objects in the data storage drive prior to assembling the intermediate object code.

20. The method of claim 18 and further comprising:
- providing an application-execution environment within the data storage drive, wherein the application-execution environment supports local processing of user data stored within the data storage drive;
- receiving the second active drive application programming interface command in the data storage drive;
- in response to receiving the second active drive application programming interface command, loading the executable code from the at least one data storage medium into the application-execution environment; and
- running the executable code in the application-execution environment.

\* \* \* \* \*